(12) United States Patent
Steckhan et al.

(10) Patent No.: US 8,532,950 B2
(45) Date of Patent: Sep. 10, 2013

(54) METHOD FOR CALIBRATING A STAGE-CAMERA SYSTEM, AND A STAGE-CAMERA SYSTEM

(75) Inventors: Dirk Steckhan, München (DE); Matthias Elter, Erlangen (DE); Thorsten Zerfass, Nürnberg (DE)

(73) Assignee: Fraunhofer-Gesellchaft zur Forderung der Angewandten Forschung E.V., Munich (DE)

( * ) Notice: Subject to any disclaimer, the term of this patent is extended or adjusted under 35 U.S.C. 154(b) by 688 days.

(21) Appl. No.: 12/402,783

(22) Filed: Mar. 12, 2009

(65) Prior Publication Data
US 2010/0066838 A1    Mar. 18, 2010

(30) Foreign Application Priority Data
Mar. 12, 2008   (DE) .......................... 10 2008 014 030

(51) Int. Cl.
*G01D 18/00* (2006.01)
*G02B 21/00* (2006.01)

(52) U.S. Cl.
USPC .......................................... 702/85; 359/368

(58) Field of Classification Search
USPC ........... 702/85, 33, 36, 81, 84, 90–91, 94–95, 702/97, 127, 150–154, 182, 189; 382/106, 382/154, 286, 291, 294–295, 312, 318; 348/187, 207.99, 208.14, E17.002; 250/252.1, 250/370.08, 370.1; 359/363, 368, 391, 397; 703/1–2, 4
See application file for complete search history.

(56) References Cited

U.S. PATENT DOCUMENTS

| | | | |
|---|---|---|---|
| 3,986,007 A | | 10/1976 | Ruoff |
| 5,581,487 A | * | 12/1996 | Kelly et al. ..................... 702/85 |
| 6,448,555 B1 | * | 9/2002 | Hosokawa ........................ 850/9 |
| 2003/0190091 A1 | * | 10/2003 | Stewart et al. ............... 382/294 |
| 2004/0114218 A1 | | 6/2004 | Karlsson et al. |
| 2005/0270370 A1 | * | 12/2005 | Uemura et al. ................ 348/79 |
| 2006/0028716 A1 | | 2/2006 | Gilbert |
| 2006/0279746 A1 | | 12/2006 | Stock |
| 2007/0211243 A1 | | 9/2007 | Laroche et al. |

FOREIGN PATENT DOCUMENTS

| | | |
|---|---|---|
| DE | 37 18 066 A1 | 12/1988 |
| DE | 10 2004 029 912 A1 | 1/2006 |
| DE | 10 2006 034 906 A1 | 1/2008 |
| DE | 10 2006 036 172 A1 | 2/2008 |
| WO | 2004034124 A1 | 4/2004 |
| WO | 2005017597 A1 | 2/2005 |

OTHER PUBLICATIONS

Gao et al., Self-Calibration of Lateral Non-Linearities of an Interference Microscope, 2003, Measurement 34, pp. 245-253.*

(Continued)

*Primary Examiner* — Toan Le
(74) *Attorney, Agent, or Firm* — Browdy and Neimark, PLLC

(57) ABSTRACT

In a method for calibrating a stage-camera system, a travel distance of a stage is determined in a first coordinate system and an object displacement distance of at least one object is determined in a second coordinate system. A calibration measure for calibrating the coordinate systems is computed from the travel distance and the object displacement distance. The object displacement distance is determined by registering a calibration image with a reference image based on the at least one object. The method enables an automatic and accurate calibration of the stage-camera system.

12 Claims, 4 Drawing Sheets

(56) References Cited

OTHER PUBLICATIONS

H. Foroosh, et al., "Extension of Phase Correlation to Subpixel Registration", IEEE Transactions on Image Processing, Mar. 2002, p. 188-200, vol. 11, No. 3.

J. Miller, et al., "MUSE: Robust surface fitting using unbiased scale estimates", IEEE Computer Society Conference on Computer Vision and Pattern Recognition, 1996.

M. Ammi, et al., "Flexible Microscope Calibration using Virtual Pattern for 3-D Telemicromanipulation", Proceedings of the 2005 IEEE, International Conference on Robotics and Automation, Apr. 18, 2005, p. 3888-3893, IEEE.

S. Hutchinson, et al., "A Tutorial on Visual Servo Control", IEEE Transactions on Robotics and Automation, Oct. 1, 1996, p. 651-670, vol. 12, No. 5, IEEE.

* cited by examiner

METHOD FOR CALIBRATING A STAGE-CAMERA SYSTEM, AND A STAGE-CAMERA SYSTEM

The present application claims priority to German Application No. 10 2008 014 030.9, filed on Mar. 12, 2008.

BACKGROUND OF THE INVENTION

1. Field of the Invention

The invention relates to a method for calibrating a stage-camera system. The invention also relates to a stage-camera system for a microscope.

2. Background Art

Computer-assisted microscopy is directed to recording and analyzing biological samples. Examples are automatic examination of cervix cells and automatic generation of differential haemograms. Fully automatic microscopes use a control device to control all mechanical and electronic components of the microscope, so that prepared object holders can be fully autonomously scanned and examined.

The calibration of the automated microscopes is performed manually by using a calibration object holder. The calibration object holder is arranged on a movable stage of the microscope. An image is recorded from a discernible location of the calibration object holder. The position of the discernible location in the image is determined manually, for example with a mouse pointer. The stage with the calibration object holder is then moved by a defined travel distance. Another image is then recorded. The position of the discernible location in this image is also determined manually. It can be coarsely determined from the travel distance of the stage and the manually determined positions of the discernible location of the calibration object holder which travel distance of the stage corresponds to which object displacement distance in a camera image. Disadvantageously, the calibration process using a manual method for calibrating the stage-camera system of the microscope is time-consuming Manual calibration is also imprecise, with a varying degree of inaccuracy.

SUMMARY OF THE INVENTION

It is therefore an object of the invention to provide a method for calibrating a stage-camera system that is fast and accurate.

This object is attained by the invention with a method for calibrating a stage-camera system, comprising the steps of:
providing a stage-camera system with a stage and a camera, wherein
the stage and the camera are arranged relative to one another in a reference position, and
at least one object is arranged on the stage in a recording region of the camera,
recording a reference image of the at least one object in the reference position,
moving the stage-camera system with at least one electric drive motor such that the stage and the camera are arranged relative to one another in a calibration position, wherein
the calibration position is different from the reference position, and
at least a portion of the at least one object is located in the recording region of the camera in the calibration position,
recording a calibration image of the at least one object in the calibration position,
determining a travel distance, from the reference position to the calibration position in a first coordinate system with an electronic control device,
registering the calibration image with the reference image based on the at least one object with the electronic control device,
determining an object displacement distance in a second coordinate system based on the registered calibration image with the electronic control device, and
determining a calibration measure from the travel distance and the object displacement distance for calibrating the coordinate systems with the electronic control device.

According to the invention, it has been a recognized that the object displacement distance can be determined very accurately and calibration can be fully automated by registering a calibration image with a reference image based on at least one arbitrary object. After the reference image is recorded in an arbitrary reference position, the stage-camera system is moved into the calibration position with the at least one electric drive motor. The calibration position is different from the reference position. In the calibration position, at least a portion of the at least one object recorded in the reference image must be located in the recording region of the camera, so that this portion can be recorded in the calibration image. The travel distance of the stage relative to the camera can be easily determined, because the movement is performed in a controlled or regulated manner with the at least one drive motor, so that all required information for determining the travel distance are present in an electronic control device. The travel distance is determined relative to the first coordinate system, relative to which the stage is also moved. After the calibration image has been recorded, the calibration image is registered with the reference image. Registration is performed based on the at least one object which can be seen in both the reference image and—at least partially—in the calibration image. Registration methods based on areas or specific features can be used for registration of the calibration image, such as correlation methods, mathematical estimators, or the so-called Harris-Corner detector. Registration of the calibration image with the reference image directly provides the object displacement distance by which the at least one object is moved in the calibration image relative to the reference image when the stage was moved relative to the camera. The object displacement distance is determined relative to the second coordinate system, relative to which the at least one object is also moved in the camera images. A calibration measure can be determined from the travel distance and the object displacement distance which indicates which travel distance in the first coordinate system corresponds to which object displacement distance in the second coordinate system. The method of the invention makes possible a fully automated, fast and precise calibration of the stage-camera system.

A modified embodiment in which the travel is performed in an x-y plane and the travel distance in the first coordinate system has an x-component and a y-component ensures rapid calibration of a stage-camera system that is movable in two dimensions, because a calibration in an x-direction and a y-direction is possible by moving the stage-camera system only once. Preferably, the stage-camera system is moved within a defined area under random control.

Determining the travel distance from a number of steps of the at least one electric drive motor is simplified by implementing the at least one electric drive motor as a stepper motor.

A modified embodiment in which the registration of the calibration image is performed with subpixel accuracy is particularly accurate. Subpixel accuracy means that the calibration image can be registered with the reference image with a precision of a fraction of a pixel of the camera resolution. The object displacement distance can hence be determined with a greater precision than the resolution accuracy of the camera. This is possible because registration methods that are accurate in the subpixel range evaluate the intensity distributions in the pixels in the reference image and the calibration image. This is particularly advantageous if the stage can be positioned relative to the camera with subpixel accuracy using the at least one electric drive motor. The aforementioned registration methods based on areas and features allow registration with subpixel accuracy. For example, the method of Foroosh et al. can be used as a registration method with subpixel accuracy, which is described in the publication "Extension of Phase Correlation to Subpixel Registration" (IEEE Transactions on Image Processing, Vol. 11, No. 3, March 2002). In this method, it is assumed that the correlation peak in images displaced in the subpixel range is not concentrated in a pixel, but that satellite peaks exist in the immediate vicinity to the main peak. The position of the images can be determined from the height of the various peaks with subpixel accuracy.

A movement of the stage-camera system in which the stage-camera system is moved to several different calibration positions, wherein a calibration image is recorded at each calibration position and a travel distance as well as an associated object displacement distance is determined, enables a reliable calibration, because errors can be identified when determining the travel distance or the object displacement distance.

A modified embodiment in which the reference image includes several objects and each calibration image includes at least a portion of one of the objects, wherein the registration of the calibration images is performed at least in part based on different objects, allows greater travel distances in different directions. This increases the reliability of the calibration.

Determination of the calibration measure with an optimization method, wherein the optimization method minimizes a quality function, increases the calibration accuracy. The calibration measure is determined by solving a system of equations. If several calibration images are recorded and accordingly several object displacement distances are determined, then the system of equations is overdetermined. The overdetermined system of equations can be optimally solved with an optimization method that minimizes a quality function, for example minimizes the least-square error. Preferably, linear optimization methods are used, for example the Random-Sample-Consensus (RANSAC) algorithm, the Maximum-LikelihoodEstimation-Sample-Consensus (MLESAC) algorithm, the MinimumUnbiased-Scale-Estimator (MUSE), the M-Estimator-Sample-Consensus algorithm (MSAC), or the Least-Mean-Squares algorithm (LMS).

An optimization method being implemented as Minimum-Unbiased-Scale-Estimator is robust and accurate. The Minimum-Unbiased-Scale-Estimator is described in the publication by James V. Miller and Charles V. Steward "MUSE: Robust Surface Fitting using Unbiased Scale Estimates" (1996 IEEE Computer Society Conference on Computer Vision and Pattern Recognition, 1996, p. 300).

With a calibration measure being a coordinate transformation matrix between the first and the second coordinate system, scaling between the coordinate systems as well as a rotation of the coordinate systems relative to one another can be taken into account.

It is also an object of the invention to provide a stage-camera system for a microscope that can be quickly and accurately calibrated.

This object is attained by the invention with a stage-camera system with
 a camera for recording images,
 a stage, wherein
  the stage and the camera are movable relative to one another, and
  at least one object can be positioned on the stage in a recording region of the camera,
 at least one electric drive motor for moving the stage and the camera relative to one another,
 an electronic control device with
  a drive unit, with which the movement from a reference position to a calibration position can be controlled and a travel distance can be determined in a first coordinate system,
  an image recording unit, with which recording of a reference image of the at least one object in the reference position and of a calibration image of the at least one object in the calibration position can be controlled,
  a registration unit, with which the calibration image can be registered with the reference image and an object displacement distance can be determined in a second coordinate system, and
  a calibration unit, with which a calibration measure can be determined from the travel distance and the object displacement distance for calibrating the coordinate systems.

The advantages of the stage-camera system of the invention correspond to the already described advantages of the method of the invention.

A modified embodiment in which the at least one electric drive motor is implemented as a stepper motor allows a simple determination of the travel distance. In addition, the stage can be readily positioned relative to the camera with subpixel accuracy.

The stage-camera system can be accurately calibrated with a registration unit being configured so that the calibration image can be registered with the reference image with subpixel accuracy. This is particularly advantageous when the stage can be positioned relative to the camera with subpixel accuracy.

The stage-camera system can be accurately and robustly calibrated with a calibration unit being configured so that the calibration measure can be determined by an optimization method for minimizing a quality function.

With a microscope comprising a stage-camera system according to the invention, a large number of medical tests can be performed fully automatically. Such tests are, for example, screening of Pap smears, the automatic generation of differential haemograms and the examination of erythrocytes in malaria studies.

Additional features and advantages of the invention are described below with reference to an exemplary embodiment and the drawing.

DESCRIPTION OF THE PREFERRED EMBODIMENT

Figure 1:
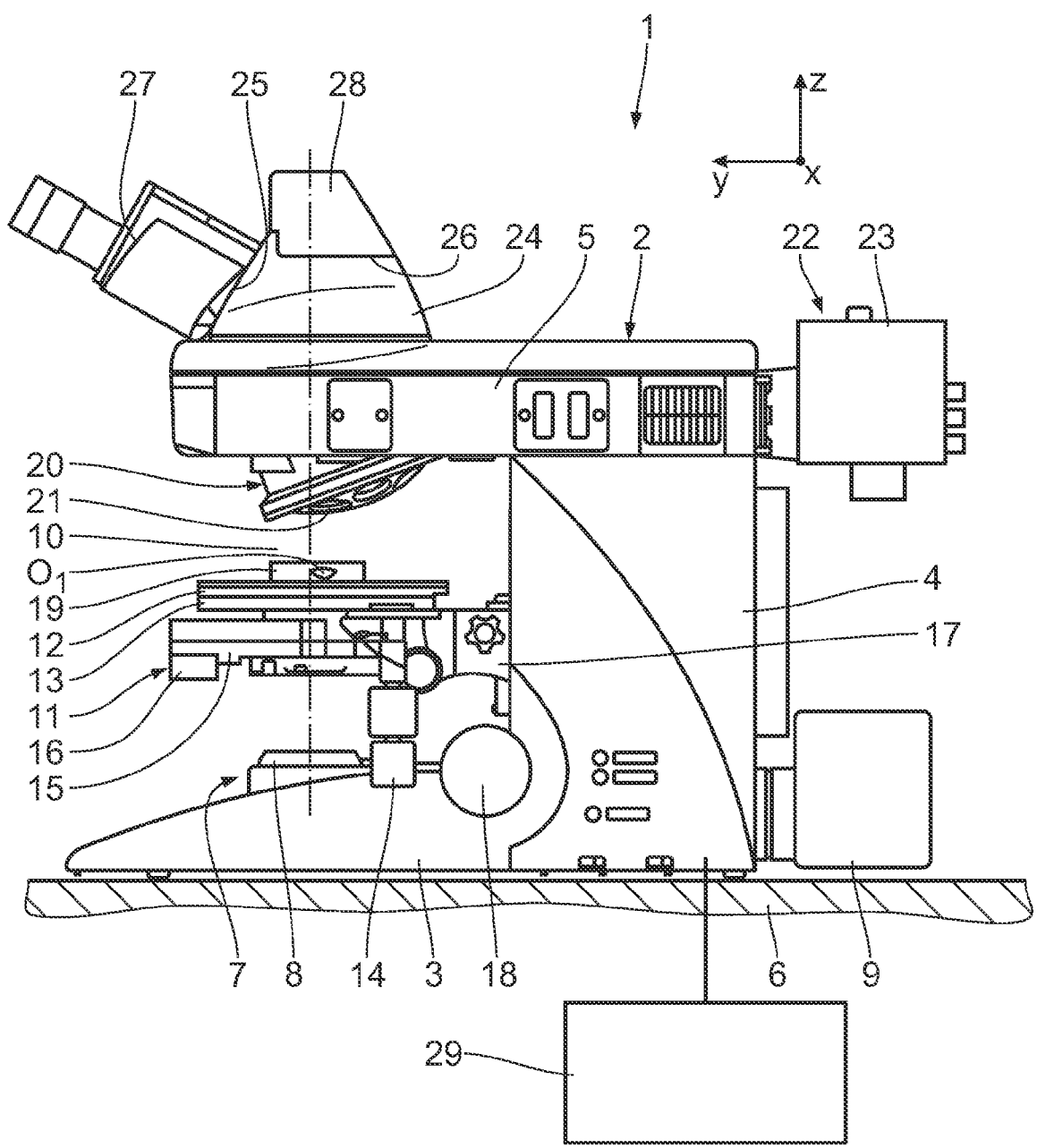
FIG. 1 shows a schematic diagram of a microscope with a stage-camera system.
Figure 2:
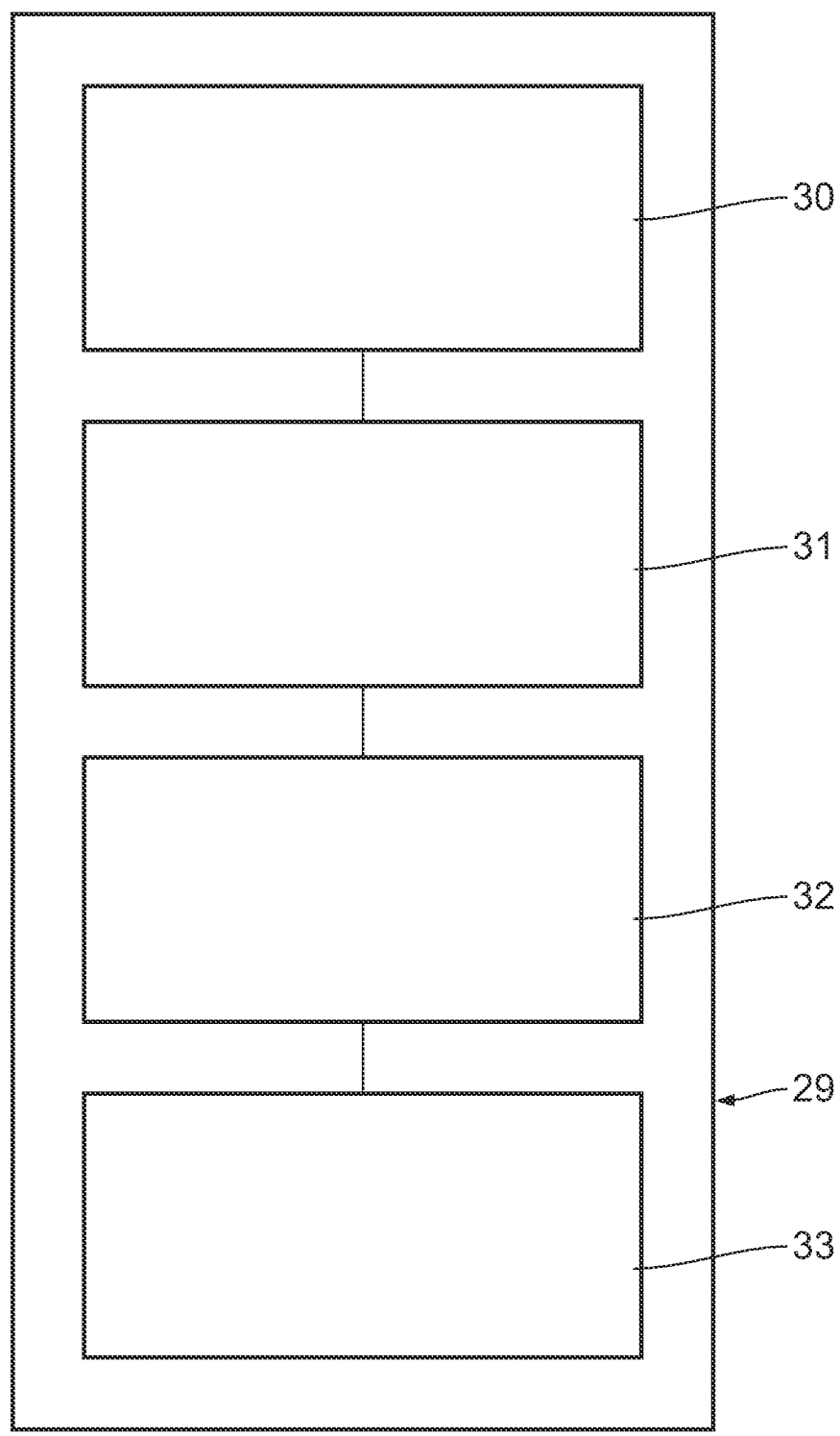
FIG. 2 shows a schematic diagram of an electronic control device of the stage-camera system of FIG. 1.

FIG. 1 shows a microscope 1 implemented as a digital microscope, which can be used in computer-assisted microscopy. The microscope includes a stand 2 with a base 3, a column 4 and a top section 5. The stand 3 is shaped like a foot and serves to securely position the microscope 1 on a support surface 6. A transmission illumination device 7 is integrated in the base 3. The transmission illumination device 7 includes a transmission illumination opening 8 integrated in the base 3 and a transmission illumination source 9 arranged on the side of the base 3.

The column 4 is oriented essentially perpendicular to the base 3 and the top section 5. When viewed in cross-section, the base 3, the column 4 and to the top section 5 are arranged in a U-shape relative to one another and essentially demarcate a microscope space 10.

A cross slide 11 with a stage 12 is arranged on the column 4 in the microscope space 10. The stage 12 is fixedly arranged on an x-slide 13. The x-slide 13 can be moved with an electric x-drive motor 14 in an x-direction on a y-slide 15. The y-slide 15 can likewise be moved with an electric y-drive motor 16 in a y-direction on a z-slide 17. The z-slide 17 can be moved with an electric z-drive motor 18 in a z-direction along the side of the column 4 facing the microscope space 10. The drive motors 14, 16, 18 are implemented as stepper motors. An object holder 19 with objects $O_1$, $O_2$ to be examined is arranged on the stage 12.

A lens turret 20 with several microscope objectives 21 is rotatably arranged on the side of the top section 5 facing the microscope space 10. A reflected light illumination device 22 is integrated in the top section 5. The reflected light illumination device 22 has a reflected light illumination opening integrated in the top section 5, which is not shown in detail, and a reflected light illumination source 23 arranged on the side of the top section 5.

A beam splitter 24 with a tube output 25 and a camera output 26 is arranged on a side of the top section 5 facing the lens turret 20. A tube 27 is attached on the tube output 25. A camera 28 implemented as a digital camera is correspondingly attached on the camera output 26.

The drive motors 14, 16, 18 and the camera 28 are connected to an electronic control device 29. The control device 29 is used for controlling the drive motors 14, 16, 18, the illumination devices 7, 22, the lens turret 20 and the camera 28.

The stage 12 of which can be moved with the x-drive motor 14 and the y-drive motor 16 in an x-y-plane, the camera 28 and the electronic control device 29 form a stage-camera system to be calibrated. For calibration, the control device 29 has a drive unit 30, an image recording unit 31, a registration unit 32 and a calibration unit 33.

The drive unit 30 is used to move the stage 12 relative to the camera 28 in a first coordinate system $K_1$. The first coordinate system $K_1$ is stationary in relation to the stand 2 and the camera 28. The x-axis of the first coordinate system $K_1$ is referred to as $x_1$ and is oriented parallel to the x-direction. The y-axis of the first coordinate system $K_1$ is referred to as $y_1$ and is oriented parallel to the y-direction.

The image recording unit 31 is used for controlling the camera 28 for recording digital images and for processing these images. The images are recorded and processed in a second coordinate system $K_2$ which is stationary relative to the recording region 34 of the camera 28.

The second coordinate system $K_2$ is rotated relative to the first coordinate system $K_1$ by an angle $\phi$. An origin $U_1$ of the first coordinate system $K_1$ and an origin $U_2$ of the second coordinate system $K_2$ are displaced relative to the first coordinate system $K_1$ by a translation vector $t_1$. The translation vector $t_1$ hence describes the position of the second coordinate system $K_2$ relative to the first coordinate system $K_1$. The x-axis of the second coordinate system $K_2$ is referred to as $x_2$. Likewise, the y-axis of the second coordinate system $K_2$ is referred to as $y_2$.

The recording region 34 of the camera 28 is divided into pixels 35 which characterize the resolution of the camera 28. Accordingly, the second coordinate system $K_2$ has discrete pixel coordinates.

The registration unit 32 is used for registering images recorded with the camera 28. A registration process is implemented in the registration unit 32 which enables registration of the images with subpixel resolution.

The calibration unit 33 is used for determining a coordinate transformation matrix A between the first coordinate system $K_1$ and the second coordinate system $K_2$. The coordinate transformation matrix A represents a calibration measure. A linear optimization method for minimizing a quality function is implemented in the calibration unit 33.

Figure 3:
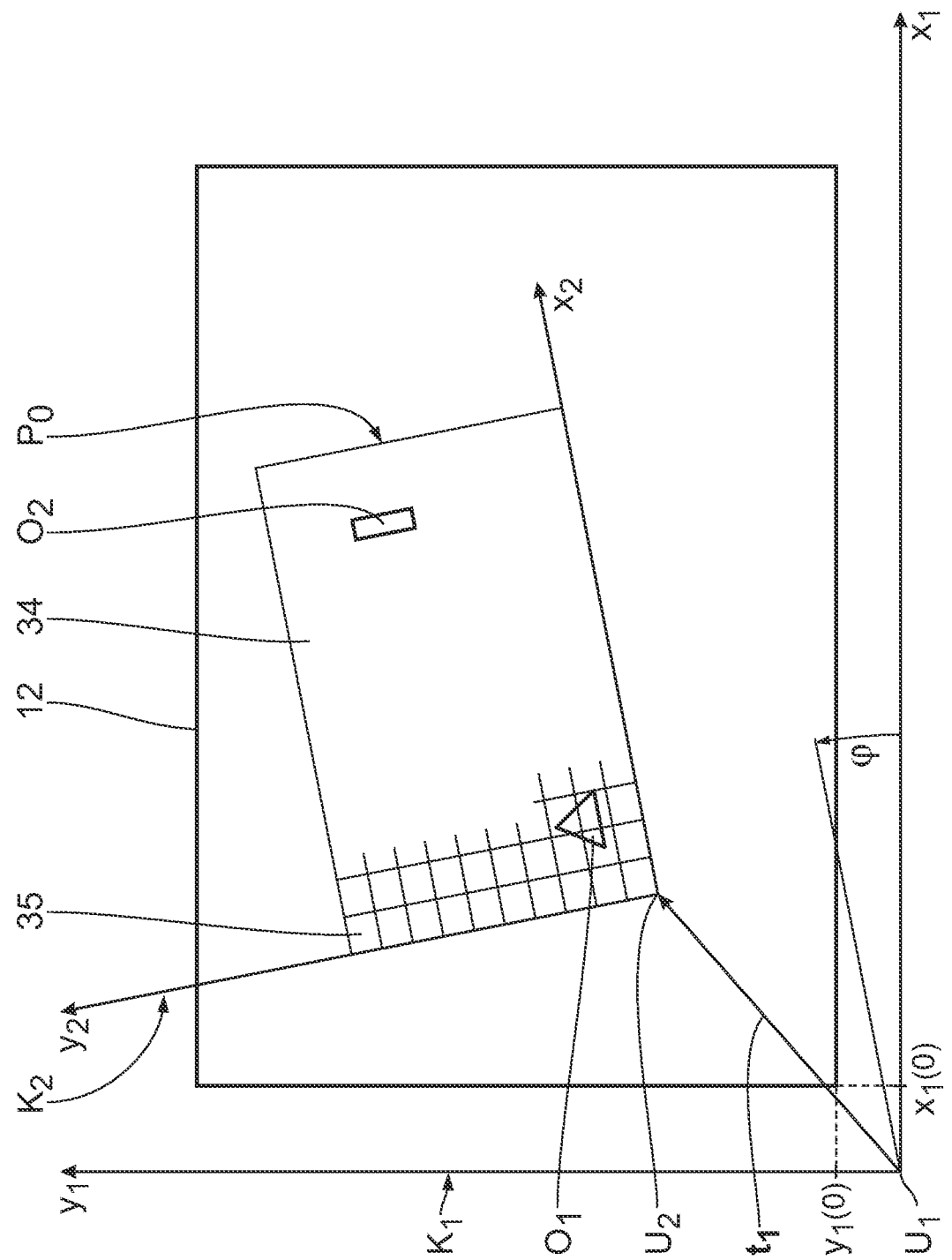
FIG. 3 shows a schematic diagram of the stage-camera system in a reference position.

The method for calibrating the stage-camera system will now be described in more detail. In FIG. 3, the stage 12 is arranged relative to the camera 28 in an arbitrary reference position $S_0$. The position of the camera 28 is indicated in FIG. 3 by the associated recording region 34. A first object $O_1$ and a second object $O_2$ are arranged on the stage 12 in the recording region 34. The camera 28 records in the reference position $S_0$ a reference image $P_0$ with the objects $O_1$, $O_2$. The drive unit 30 stores for the reference position $S_0$ the coordinates $x_1(0)$, $y_1(0)$ of the stage 12 in the first coordinate system $K_1$.

Figure 4:
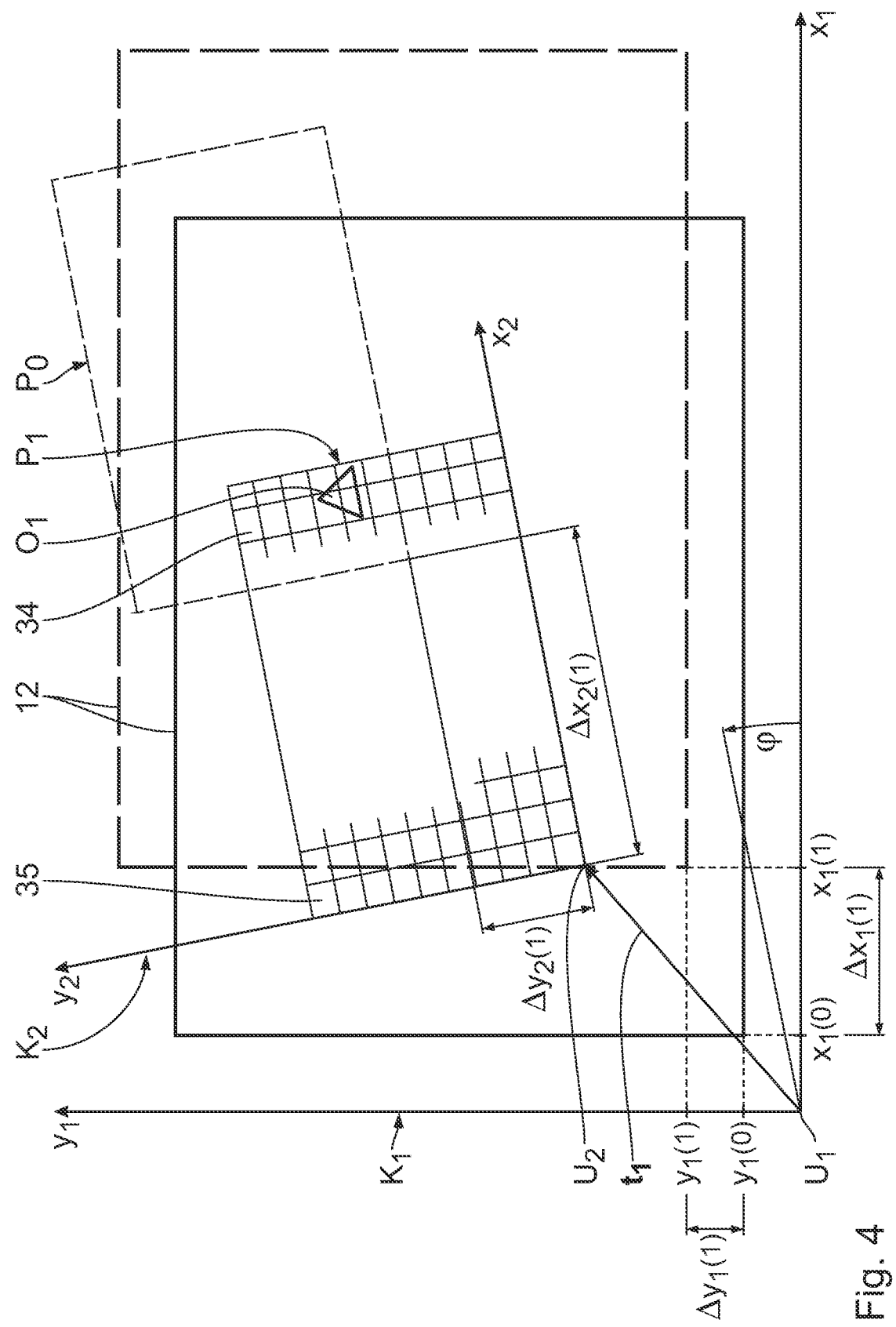
FIG. 4 shows a schematic diagram of the stage-camera system in a calibration position.

The stage 12 is then moved with the help of the x-drive motor 14 and the y-drive motor 16 relative to the camera 28 in the x-y-plane into a calibration position $S_1$ that is different from the reference position $S_0$. In calibration position $S_1$, the object $O_1$ is still located in the recording region 34, whereas the object $O_2$ moves out of the recording region 34 when the stage 12 moves. The calibration position $S_1$ of the stage 12 relative to the camera 28 is illustrated in FIG. 4.

In the calibration position $S_1$, a calibration image $P_1$ with the first object $O_1$ is recorded with the camera 28. The drive unit 30 stores for the calibration position $S_1$ the coordinates $x_1(1)$, $y_1(1)$ of the stage 12 in the first coordinate system $K_1$. The coordinates $x_1(1)$, $y_1(1)$ in the calibration position $S_1$ are determined in a simple manner based on the executed number of steps of the x-drive motor 14 in the x-direction and of the y-drive motor 16 in the y-direction. The drive unit 30 determines a travel distance $\Delta x_1(1)$, $\Delta y_1(1)$ of the stage 12 from the reference position $S_0$ to the calibration position $S_1$ in the first coordinate system $K_1$ according to the following equations:

$$\Delta x_1(1) = x_1(1) - x_1(0) \qquad (1)$$

$$\Delta y_1(1) = y_1(1) - y_1(0) \qquad (2)$$

The registration unit 32 registers the calibration image $P_1$ with the reference image $P_0$ based on the object $O_1$ which is located in both the reference image $P_0$ and the calibration image $P_1$. Registration is performed by using a similarity measure which characterizes the identity between the reference image $P_0$ and the calibration image $P_1$. The similarity measure can be optimized using known registration methods. Area-based or feature-based registration methods can be employed. The calibration image $P_1$ is registered in relation to the reference image $P_0$ with subpixel accuracy by having the registration method evaluate the intensities of the individual pixels 35. Subpixel accuracy here means that the object displacement distance $\Delta x_2(1)$, $\Delta y_2(1)$ can be determined with higher resolution than the discrete pixel coordinates. Registration of the calibration image $P_1$ then provides the object displacement distance $\Delta x_2(1)$, $\Delta y_2(1)$ in the second coordinate system $K_2$.

The coordinate transformation matrix A as a calibration measure is determined with the calibration unit 33. The coordinate transformation matrix A is calculated by assuming that the stage 12 is oriented perpendicular to the camera 28. Shear is neglected. The planes defined by the coordinate systems $K_1$, $K_2$ are hence parallel to one another. The following equation applies to a two-dimensional similarity transformation:

$$p_1 = S \cdot R \cdot p_2 + t_1 = A \cdot p_2 + t_1 \quad (3)$$

In equation (3):

$$p_1 = \begin{pmatrix} x_1 \\ y_1 \end{pmatrix} \quad (4)$$

denotes a point vector in the first coordinate system $K_1$, $$p_2 = \begin{pmatrix} x_2 \\ y_2 \end{pmatrix} \quad (5)$$

denotes a point vector in the second coordinate system $K_2$, $$S = \begin{pmatrix} s_x & 0 \\ 0 & s_y \end{pmatrix} \quad (6)$$

denotes a scaling matrix, $$R = \begin{pmatrix} \cos\varphi & -\sin\varphi \\ \sin\varphi & \cos\varphi \end{pmatrix} \quad (7)$$

denotes a rotation matrix, $$t_1 = \begin{pmatrix} t_x \\ t_y \end{pmatrix} \quad (8)$$

denotes the translation vector, which describes the position of the second coordinate system $K_2$ in relation to the first coordinate system $K_1$.

By forming the difference of equation (3) at two points, one arrives at the following equation:

$$\Delta p_1 = A \cdot \Delta p_2 \quad (9)$$

The translation vector $t_1$ is eliminated in equation (9), because equation (9) contains coordinate differences, meaning relative rather than absolute coordinates.

$$\Delta p_1 = \begin{pmatrix} \Delta x_1 \\ \Delta y_1 \end{pmatrix} \quad (10)$$

describes the travel distance of the stage 12 from the reference position $S_0$ to a calibration position $S_1$.

$$\Delta p_2 = \begin{pmatrix} \Delta x_2 \\ \Delta y_2 \end{pmatrix} \quad (11)$$

describes the object displacement distance from the reference position $S_0$ to a calibration position $S_1$.

The coordinate transformation matrix A is obtained by multiplying the scaling matrix S with the rotation matrix R by taking into account that the scaling factor in the x-direction $s_x$ and the scaling factor in the y-direction $s_y$ are identical and can therefore be described by a direction-independent scaling factor s as:

$$A = \begin{pmatrix} s \cdot \cos\varphi & -s \cdot \sin\varphi \\ s \cdot \sin\varphi & s \cdot \cos\varphi \end{pmatrix} \quad (12)$$

A system of linear equations with two equations and two unknowns s and $\varphi$ is obtained by inserting the travel distance $\Delta x_1(1)$, $\Delta y_1(1)$ from the reference position $S_0$ to the calibration position $S_1$ and the associated object displacement distance $\Delta x_2(1)$, $\Delta y_2(1)$ between the reference image $P_0$ and the calibration image $P_1$ in equation (9). This system of equations can be solved analytically, whereby the result is the coordinate translation matrix A. Absolute coordinates can be determined with equation (3).

To enhance the reliability of the calculation of the coordinate translation matrix A, several calibration positions $S_n$ with n=1 to N can be accessed with the drive motors 14, 16, wherein a calibration image $P_n$ with n=1 to N is recorded with the camera 28 at each calibration position $S_n$. When moving to the calibration positions $S_n$, it should be noted that at least a portion of one of the objects $O_1$, $O_2$ located in the reference image $P_0$ is also located in each calibration image $P_n$, so that the calibration images $P_n$ can be registered with respect to the reference image $P_0$. A travel distance $\Delta x_1(n)$, $\Delta y_1(n)$ is determined for each calibration position S. Accordingly, an object displacement distance $\Delta x_2(n)$, $\Delta y_2(n)$ is determined for each calibration image $P_n$. By inserting the travel distances $\Delta x_1(n)$, $\Delta y_1(n)$ and the associated object displacement distances $\Delta x_2(n)$, $\Delta y_2(n)$ into the equation (9), an overdetermined system of equations is obtained. For solving this overdetermined system of equations, the optimization method implemented in the calibration unit 33 is used, which minimizes a quality function, for example the least-square error. The optimization method provides as a result the coordinate transformation matrix A.

The calibration of the coordinate systems $K_1$, $K_2$ results in an association between the pixel coordinates of the camera 28 and the position of the stage 12 with subpixel accuracy. The stage 12 can then be moved with subpixel accuracy and specific points on the object holder 19 can be accessed repeatedly and reliably. An alignment error of the camera 28 is compensated, because the calibration includes rotation of the second coordinate system $K_2$ relative to the first coordinate system $K_1$. The calibration is fully automated and can be performed with arbitrary objects $O_1$, $O_2$. The calibration is accurate and robust due to the registration method having subpixel accuracy and the optimization method that determines the coordinate transformation matrix A. Recording a larger region of the object holder 19 in several images as well as recording in different resolution steps is no longer a problem after calibration.

In virtual microscopy, an object holder 19 can be automatically scanned and digitized without a problem. Because the images of the object holder 19 are calibrated exactly, they can be combined without being registered.

Moreover, as a result of the exact calibration, screening of Pap smears can be automated and objectively recorded. The calibration ensures that no carcinogenic cells are found simultaneously on two images and that no carcinogenic cells are overlooked. In addition, carcinogenic cells located at the edges of the images are cleanly joined.

When measuring differential blood counts in computer-assisted microscopy automatically, the object holder 19 is initially scanned at low resolution. A defined number of leucocytes is automatically detected in the recorded images using image processing methods. With the information about the position of the leucocytes on the object holder 19, the leucocytes are individually accessed, focused and recorded at higher resolution in a subsequent step to determine the exact type of the individual leucocytes at the higher resolution. The calibration in the recording taken at lower resolution ensures that no leucocytes are scanned twice or are overlooked. When the leucocytes are accessed again at higher resolution, calibration also ensures that the individual leucocytes can be viewed and examined in the actual field of view.

When testing for malaria, calibration ensures that each erythrocyte can be investigated and reliably accessed at higher resolution.

What is claimed is:

1. A method for automatically calibrating a stage-camera system of a microscope, comprising the steps of:
    providing a stage-camera system with a stage and a camera, wherein
    the stage and the camera are arranged relative to one another in an arbitrary reference position, and
    several objects are arranged on the stage in a recording region of the camera,
    recording a reference image of the objects in the reference position, wherein the reference image includes the objects,
    moving the stage-camera system with at least one electric drive motor such that the stage and the camera are arranged relative to one another in at least one calibration position, wherein
    the stage-camera system is moved in different directions to several different calibration positions,
    each calibration position is different from the reference position, and
    at least a portion of at least one of the objects is located in the recording region of the camera in the each calibration position,
    recording a calibration image of the at least one object in each calibration position, wherein each calibration image includes the portion of the at least one object,
    determining a travel distance from the reference position to each calibration position in a first coordinate system with an electronic control device,
    registering each calibration image with the reference image based on the at least one object with the electronic control device, wherein
    the registration of each calibration image is performed with sub-pixel accuracy, and
    the registration of the calibration images is performed at least in part based on different objects,
    determining an object displacement distance in a second coordinate system based on each registered calibration image with the electronic control device, and
    determining a calibration measure from the travel distances and the object displacement distances for calibrating the coordinate systems with the electronic control device,
    wherein the calibration measure is a coordinate transformation matrix between the first and the second coordinate system and is determined by solving an overdetermined system of equations,
    wherein the overdetermined system of equations comprises the determined travel distances, the determined object displacement distances and the coordinate transformation matrix, and
    wherein the coordinate transformation matrix is determined by solving the overdetermined system of equations using an optimization method which minimizes a quality function of the overdetermined system of equations.

2. The method according to claim 1, wherein each travel is performed in an x-y plane and each travel distance in the first coordinate system has an x-component and a y-component.

3. The method according to claim 1, wherein each travel distance is determined from a number of steps of the at least one electric drive motor.

4. The method according to claim 1, wherein the optimization method is implemented as Minimum-Unbiased-Scale-Estimator.

5. The method according to claim 1, wherein the stage-camera system is moved within a defined area under random control by using the at least one electric drive motor, said at least one electric drive motor being controlled by the electric control device.

6. The method according to claim 1, wherein the stage is positioned relative to the camera with sub-pixel accuracy using the at least one electric drive motor.

7. A microscope with a stage-camera system comprising:
    a camera for recording images,
    a stage, wherein
    the stage and the camera are movable relative to one another, and
    several objects are positionable on the stage in a recording region of the camera,
    at least one electric drive motor for moving the stage and the camera relative to one another,
    an electronic control device for automatically calibrating the stage-camera system with
    a drive unit, with which the movement from an arbitrary reference position in different directions to several different calibration positions is controllable and associated travel distances are determinable in a first coordinate system,
    an image recording unit, with which recording of a reference image of the objects in the reference position and of a calibration image of at least a portion of at least one of the objects in each calibration position is controllable,
    a registration unit, with which the calibration images are registerable with the reference image and associated object displacement distances are determinable in a second coordinate system, wherein the registration unit is configured so that the calibration images are registerable with the reference image with subpixel accuracy, and the registration of the calibration images is performed at least in part based on different objects, and a calibration unit, with which a calibration measure is determinable from the travel distances and the object displacement distances or calibrating the coordinate systems, wherein the calibration measure is a coordinate transformation matrix between the first and the second coordinate system and the overdetermined system of equations comprises the determined travel distances, the determined object displacement distances and the coordinate transformation matrix, and wherein the coordinate transformation matrix is determined by solving the overdetermined system of equations using an optimization method for which is minimizing a quality function of the overdetermined system of equations.

8. The microscope according to claim 7, wherein the at least one electric drive motor is implemented as a stepper motor.

9. The microscope according to claim 7, wherein the stage-camera system is moveable within a defined area under random control by using the at least one electric drive motor, said at least one electric drive motor being controlled by the electric control device.

10. The microscope according to claim 7, wherein the stage is positioned relative to the camera with sub-pixel accuracy.

11. A method for automatically calibrating a stage-camera system of a microscope, comprising the steps of:

providing a stage-camera system with a stage and a camera, wherein the stage and the camera are arranged relative to one another in a reference position, and at least one object is arranged on the stage in a recording region of the camera, recording a reference image of the at least one object in the reference position, moving the stage-camera system with at least one electric drive motor such that the stage and the camera are arranged relative to one another in at least one calibration position, wherein the stage-camera system is moved to several different calibration positions, each calibration position is different from the reference position, and at least a portion of the at least one object is located in the recording region of the camera in each calibration position, and the stage-camera system is moved within a defined area under random control by using the at least one electric drive motor, said at least one electric drive motor being controlled by an electronic control device, recording a calibration image of the at least one object in each calibration position, determining a travel distance from the reference position to each calibration position in a first coordinate system with the electronic control device, registering each calibration image with the reference image based on the at least one object with the electronic control device, wherein the registration of each calibration image is performed with sub-pixel accuracy, determining an object displacement distance in a second coordinate system based on each registered calibration image with the electronic control device, and determining a calibration measure from the travel distances and the object displacement distances for calibrating the coordinate systems with the electronic control device, wherein the calibration measure is a coordinate transformation matrix between the first and the second coordinate system and is determined by solving an overdetermined system of equations, wherein the overdetermined system of equations comprises the determined travel distances, the determined object displacement distances and the coordinate transformation matrix, and wherein the coordinate transformation matrix is determined by solving the overdetermined system of equations using an optimization method which minimizes a quality function of the overdetermined system of equations.

12. A microscope with a stage-camera system comprising a camera for recording images, a stage, wherein the stage and the camera are movable relative to one another, and at least one object is positionable on the stage in a recording region of the camera, at least one electric drive motor for moving the stage and the camera relative to one another, an electronic control device for automatically calibrating the stage-camera-system with a drive unit, with which the movement from a reference position to several different calibration positions is controllable and associated travel distances are determinable in a first coordinate system, wherein the stage-camera system is moveable within a defined area under random control by using the at least one electric drive motor, said at least one electric drive motor being controlled by the electric control device, an image recording unit, with which recording of a reference image of the at least one object in the reference position and of a calibration image of the at least one object in each calibration position is controllable, a registration unit, with which the calibration images are registerable with the reference image and associated object displacement distances are determinable in a second coordinate system, wherein the registration unit is configured so that the calibration images are registerable with the reference image with subpixel accuracy, and a calibration unit, with which a calibration measure is determinable from the travel distances and the object displacement distances for calibrating the coordinate systems, wherein the calibration measure is a coordinate transformation matrix between the first and the second coordinate system and the overdetermined system of equations comprises the determined travel distances, the determined object displacement distances and the coordinate transformation matrix, and wherein the coordinate transformation matrix is determined by solving the overdetermined system of equations using an optimization method for which minimizes a quality function of the overdetermined system of equations.

* * * * *